(12) United States Patent
Zamponi et al.

(10) Patent No.: US 11,536,324 B2
(45) Date of Patent: Dec. 27, 2022

(54) ROTATIONAL CONNECTION SYSTEM PROVIDED WITH A FREE-WHEEL AND A LUBRICATION DEVICE

(71) Applicant: AIRBUS HELICOPTERS, Marignane (FR)

(72) Inventors: Laurent Zamponi, Vitrolles (FR); John Le Ru, Orgon (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/477,007

(22) Filed: Sep. 16, 2021

(65) Prior Publication Data
US 2022/0106990 A1    Apr. 7, 2022

(30) Foreign Application Priority Data

Oct. 1, 2020   (FR) ...................................... 2010056

(51) Int. Cl.
*F16D 41/066* (2006.01)

(52) U.S. Cl.
CPC .... *F16D 41/066* (2013.01); *F16D 2041/0665* (2013.01); *F16D 2300/06* (2013.01)

(58) Field of Classification Search
None
See application file for complete search history.

(56) References Cited

U.S. PATENT DOCUMENTS

| 3,175,661 A | * | 3/1965 | Maurer | F16D 41/07 192/113.32 |
| 4,615,414 A | | 10/1986 | Flores | |
| 4,663,989 A | | 5/1987 | Brodbeck | |
| 5,908,094 A | * | 6/1999 | Le-Calve | F16D 41/07 192/109 R |
| 2017/0122386 A1 | | 5/2017 | Veit et al. | |
| 2022/0186791 A1 | * | 6/2022 | Robert | F16D 41/067 |

FOREIGN PATENT DOCUMENTS

| DE | 4036209 C1 | 5/1992 |
| FR | 2553850 A1 | 4/1985 |
| JP | 2017003002 A | 1/2017 |

OTHER PUBLICATIONS

French Search Report for French Application No. FR2010056, Completed by the French Patent Office, dated May 26, 2021, 25 pages.

* cited by examiner

*Primary Examiner* — Timothy Hannon
(74) *Attorney, Agent, or Firm* — Brooks Kushman P.C.

(57) ABSTRACT

A lubricated rotational connection system provided with a free-wheel having a driving part and a driven part as well as at least one rotational link member arranged in a linking space, the linking space being located radially between a driving linking section and a driven linking section. A lubrication device comprises a fluid circulation device constrained to rotate with a driven pumping section of the driven part. The fluid circulation device is set in rotation with respect to a driving pumping section when the driving speed of rotation of the driving pumping section is lower than the driven speed of rotation of the driven pumping section about the axis of rotation in order to generate a forced circulation of the lubricating fluid within the linking space.

15 Claims, 4 Drawing Sheets

ROTATIONAL CONNECTION SYSTEM PROVIDED WITH A FREE-WHEEL AND A LUBRICATION DEVICE

CROSS-REFERENCE TO RELATED APPLICATIONS

This application claims priority to French patent application No. FR 20 10056 filed on Oct. 1, 2020, the disclosure of which is incorporated in its entirety by reference herein.

TECHNICAL FIELD

The present disclosure relates to a rotational connection system provided with a free-wheel and a lubrication device. The disclosure thus lies in the technical field of free-wheel lubrication, and, in particular, lubrication of a free-wheel installed inside a gearbox.

BACKGROUND

A free-wheel is usually provided with a driving part, a driven part, and at least one rotational link member.

When stopped, or as long as the driven part is rotating faster than the driving part about an axis of rotation, the free-wheel is in an operating mode referred to, for convenience, as the "desynchronized" or "disengaged" operating mode. The driving part does not transmit engine torque to the driven part and vice versa. The driven part and the driving part are rotationally disengaged from each other about the axis of rotation.

Conversely, in an operating mode referred to as the "synchronized" or "engaged" operating mode, the driving part and the driven part rotate together at the same speed about the axis of rotation. The driving part transmits engine torque to the driven part via the at least one link member.

According to one example, a roller free-wheel may include a driving part having a peripheral portion provided with ramps. Each ramp is inclined relative to a direction tangential to a circle centered on the axis of rotation. This peripheral portion provided with ramps is sometimes referred to as a "ramp wheel". Conversely, the driven part comprises a hub arranged around the driving part, this hub comprising a ring having a cylindrical face facing the ramps. Consequently, roller link members are carried by a cage and are arranged in the space radially separating the ramps and the cylindrical face. During the disengaged operating mode, the rollers are each arranged at the foot of a ramp and do not link the driving part and the driven part in rotation. During the shift to the synchronized operating mode, the rollers are moved towards the top of the ramps and temporarily wedged between the ramps and the cylindrical face. The driving part then rotates the driven part via the rollers.

This embodiment then comprises an inner drive shaft provided with the ramp wheel and a driven ring having a cylindrical face arranged around the inner drive shaft.

Alternatively, a free-wheel may comprise a driving ring with ramps surrounding a driven shaft having a cylindrical face.

Another type of free-wheel includes at least one ratchet.

Within a power plant of a rotorcraft, the driving part of a free-wheel may be linked to an engine while the driven part of the free-wheel may be linked to a rotor. The free-wheel may be arranged within the engine, or within a gearbox or even within a kinematic linkage connecting an engine to the gearbox. For example, the gearbox may include one mechanical input system for transmitting torque per engine, each mechanical input system for transmitting torque including a free-wheel.

Irrespective of its arrangement, a free-wheel can be lubricated to optimize its service life.

According to a first known embodiment, a rotational connection system comprises a greased free-wheel. The grease may tend to limit the heating of the members of the free-wheel in the contact zones between the various elements, thus limiting their wear. On a roller free-wheel, these contact zones may in particular comprise the rollers, as well as the ramps and the cylindrical face. However, the grease may have an impact on the speed of rotation of the driven part, in particular.

According to a second embodiment, the contact zones, in particular the rollers in the context of a roller free-wheel, are immersed in an oil bath.

Immersing the members of the free-wheel in oil is effective in preventing the contact zones from heating up, and thus limiting the wear of the free-wheel, during the engaged operating mode.

Conversely, during the disengaged operating mode, the oil itself may be a source of heating due to a splashing effect.

A third known embodiment consists in spraying the contact zones with oil. For example, a rotational connection system includes a jet that conveys a small amount of oil to the driving part. This driving part then comprises at least one radial port for directing the oil towards the rollers, and therefore towards the contact zones of the free-wheel.

This third embodiment thus makes it possible to circulate a small quantity of lubricant towards the contact zones during the disengaged operating mode. The circulation of a small quantity of oil helps limit the heating of the contact zones.

However, unlike the second embodiment, the third embodiment does not actually immerse the contact zones during the engaged operating mode.

Each of the preceding embodiments is therefore advantageous but has a drawback.

Document DE 4 036 209 C1 is far removed from this problem, as it relates to the lubrication of an epicyclic gear train.

Document US 2017 0 122 386 A1 describes a free-wheel provided with rollers cooperating with an elastic system. According to one variant, the free-wheel can be lubricated.

Document FR 2 553 850 describes an epicyclic gear train transmission system for a motor vehicle, provided with an internal gear, an external gear and planet gears. The system comprises a free-wheel and a lubrication device. The lubrication device is provided with an oil cup which behaves approximately in the manner of an immobilized oil cup when the internal gear is braked and immobilized.

SUMMARY

An object of the present disclosure is therefore to propose an innovative rotational connection system provided with a free-wheel and with a lubrication device that aims to provide a high level of performance both during the engaged operating mode and during the disengaged operating mode.

Thus, the disclosure relates to a rotational connection system provided with a free-wheel, said free-wheel including a driving part and a driven part that are able to rotate about an axis of rotation, said free-wheel including at least one rotational link member arranged in a linking space, said linking space being located radially, relative to the axis of rotation, between a driving linking section of the driving part and a driven linking section of the driven part, said rotational connection system including a lubrication device for lubricating the free-wheel, said lubrication device including a lubricating fluid.

In addition, said lubrication device comprises a fluid circulation device constrained to rotate, about the axis of rotation, with a driven pumping section of the driven part, a driving pumping section of the driving part and said driven pumping section being arranged one around the other radially with respect to the axis of rotation, said fluid circulation device being set in rotation with respect to the driving pumping section when the driving speed of rotation of said driving pumping section about the axis of rotation is lower than the driven speed of rotation of said driven pumping section about the axis of rotation in order to generate a forced circulation of said lubricating fluid within said linking space.

During the disengaged operating mode, the driven part actually rotates about the axis of rotation at a speed higher than the speed of rotation of the driving part about this axis of rotation. In this disengaged operating mode, the fluid circulation device is set in rotation by the driven part relative to the driving pumping section. As a result, the fluid circulation device tends to draw in the lubricating fluid. The lubricating fluid circulates within the linking space. The fluid circulation device tends to limit the splashing effects described above by emptying the linking space of its fluid.

Conversely, during the engaged operating mode, the driven part actually rotates about the axis of rotation together with the driving part about this axis of rotation. Consequently, the fluid circulation device is not set in rotation by the driven part relative to the driving pumping section. The fluid circulation device is thus inactive and no longer tends to draw in the lubricating fluid. The contact zones of the free-wheel then tend to be immersed in this lubricating fluid. The fluid circulation device is therefore designed such that, in idle mode, it creates a fluid retention barrier with a fluid level intended to immerse all the contact zones in the free-wheel.

Consequently, the lubrication device allows the contact zones of the free-wheel to be properly lubricated when the free-wheel is in the engaged operating mode and also in the disengaged operating mode.

The rotational connection system may further comprise one or more of the following features, taken individually or in combination.

According to one possibility, the fluid circulation device may be secured to the driven pumping section.

Alternatively, the fluid circulation device may be integrated with the driven pumping section. The driven pumping section and the fluid circulation device are then elements of the same one-piece component.

Additionally, or alternatively, the driven pumping section may be independent or may form a one-piece component with other constituents of the driven part.

According to one possibility compatible with the preceding possibilities, the driving part may comprise a one-piece component or several components.

According to a possibility compatible with the preceding possibilities, the driving part may at least partially surround the driven part, or the driving part may be at least partially surrounded by the driven part.

Irrespective of these various possibilities, according to a first embodiment, the fluid circulation device may comprise a pump.

Such a pump makes it possible to draw in the lubricating fluid in order to cause it to circulate through the linking space during the disengaged operating mode.

For example, the pump may be provided with a rotary impeller that is constrained to rotate with the driven pumping section.

The term "impeller" refers to a rotating member moving the lubricating fluid. For example, the pump may be an axial centrifugal pump. Therefore, the impeller may comprise blades constrained to rotate with the driven part.

According to a second embodiment, the fluid circulation device may comprise a worm screw. Such a worm screw forms an Archimedes' screw.

The fluid circulation device is thus relatively simple, using a worm screw acting as a pump.

For example, the worm screw may comprise at least one helical spline constrained to rotate with the driven pumping section.

The expression "helical spline" covers a spline having a helical shape, namely a spline following a helix.

The worm screw may comprise a single spline forming a single helical thread. However, the worm screw may, for example, have at least two threads, and, in particular, the worm screw may have two helical splines forming two threads. The number of threads may be determined by tests, calculations or simulations to optimize the flow rate of the lubricating fluid when the rotational connection system is arranged in a mechanical system. The number of threads may depend, in particular, on the relative speeds of rotation of the driving part and the driven part during use.

According to one alternative, the driven pumping section may be conical in shape.

According to a possibility compatible with the preceding possibilities and irrespective of the embodiment, said at least one rotational link member may comprise a plurality of rolling elements, each rolling element being able to move on a ramp of said driving part.

The free-wheel is then a free-wheel with ramps. The disclosure is, however, applicable to free-wheels with obstacles and shaped rollers, and in particular ratchet free-wheels.

According to a possibility compatible with the preceding possibilities and irrespective of the embodiment, said lubrication device may have at least one radial port opening into an injection space, said injection space being located radially with respect to the axis of rotation between a driving injection section of the driving part and a driven injection section of the driven part.

Thus, the lubrication device may comprise one or more radial ports for conveying the lubricating fluid between the driving part and the driven part, and more precisely into a space referred to for convenience as the "injection space" on account of the fact that the lubricating fluid is injected into this space.

Optionally, said driving linking section may be situated between said driving pumping section and said driving injection section, and said driven linking section may be situated between said driven pumping section and said driven injection section, for example with respect to a direction parallel to the axis of rotation.

Consequently, the suction produced by the fluid circulation device makes it possible to cause the lubricating fluid to flow from the injection space to the linking space containing the contact zones to be lubricated.

According to a possibility compatible with the preceding possibilities and irrespective of the embodiment, a surrounded part of the driven part is surrounded at least partially by the driving part or a surrounded part of the driving part is surrounded at least partially by the driven part, said at least one radial port is provided in the surrounded part, said surrounded part surrounding an internal space, said at least one radial port being in fluid communication with the internal space and the injection space.

In other words, when the driving part at least partially surrounds the driven part, this driven part represents the surrounded part. On the other hand, when the driven part at least partially surrounds the driving part, this driving part represents the surrounded part. In all cases, according to this possibility, the surrounded part may delimit an internal space in fluid connection with the injection space via one or more ports referred to as radial ports on account of the direction in which they extend with respect to the axis of rotation.

Alternatively, the lubricating fluid may be introduced through a radial port provided in the driving or driven part that surrounds the other part.

According to a possibility compatible with the preceding possibilities and irrespective of the embodiment, at least said driving part or said driven part comprises at least one passage for discharging said lubricating fluid, said fluid circulation device being arranged along the axis of rotation, i.e., with respect to a direction parallel to the axis of rotation, between said linking space and said at least one passage. The aim of such a device is to promote the discharging of the lubricating fluid.

The passage or passages are used to discharge the lubricating fluid. For example, the lubricating fluid may circulate in the aforementioned internal space and then reaches the injection space via the radial port or ports. The lubricating fluid moves at least towards the injection space, passes through the fluid circulation device and exits through the passage or passages. Optionally, from the injection space, a portion of the lubricating fluid may move in a direction opposite to the direction towards the injection space.

According to a possibility compatible with the preceding possibilities and irrespective of the embodiment, said lubrication device may comprise an injector which injects said lubricating fluid into said internal space.

The term "injector" is to be interpreted in the broad sense and refers to a member capable of introducing the lubricating fluid into the internal space. For example, the term "injector" may refer to a jet, an open end of a pipe, etc.

According to a possibility compatible with the preceding possibilities and irrespective of the embodiment, said rotational connection system may include at least one rotational guide bearing arranged between the driving part and the driven part.

Such a guide bearing is intended to guide the driving part and the driven part in relative rotation.

Furthermore, a vehicle may include a rotational connection system according to the disclosure.

By way of example, such a vehicle may be an aircraft, or even a rotorcraft, or even a helicopter.

The disclosure also relates to a method for lubricating a rotational connection system that is provided with a free-wheel, said free-wheel including a driving part and a driven part that are able to rotate about an axis of rotation, said free-wheel including at least one rotational link member arranged in a linking space, said linking space being located radially, relative to the axis of rotation, between a driving linking section of the driving part and a driven linking section of the driven part, said rotational connection system including a lubrication device for lubricating the free-wheel, said lubrication device including a lubricating fluid.

The method may be implemented by a system according to the disclosure. The method may comprise the following steps:

during a disengaged operating mode of the free-wheel during which said driving part and said driven part are rotationally disengaged from each other about said axis of rotation, a fluid circulation device of the lubrication device is set in rotation, relative to a driving pumping section of the driving part, by speed differential between a driving speed of rotation, about the axis of rotation, of said driving pumping section and a driven speed of rotation, about the axis of rotation, of a driven pumping section constrained to rotate with the fluid circulation device, and said lubricating fluid is forced to move within said linking space at least under the influence of said fluid circulation device.

The system can be dimensioned so that, during this disengaged operating mode, the leakage flow rate of the lubricating fluid through the linking space is greater than a feed flow rate at which the lubricating fluid is introduced into this system.

Furthermore, during an engaged operating mode of the free-wheel during which said driving part and said driven part rotate together about said axis of rotation, the method may include inhibiting said forced movement.

However, the system may be dimensioned so that, during this engaged operating mode, the leakage flow rate of the lubricating fluid through the linking space is not zero but is less than the feed flow rate.

BRIEF DESCRIPTION

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
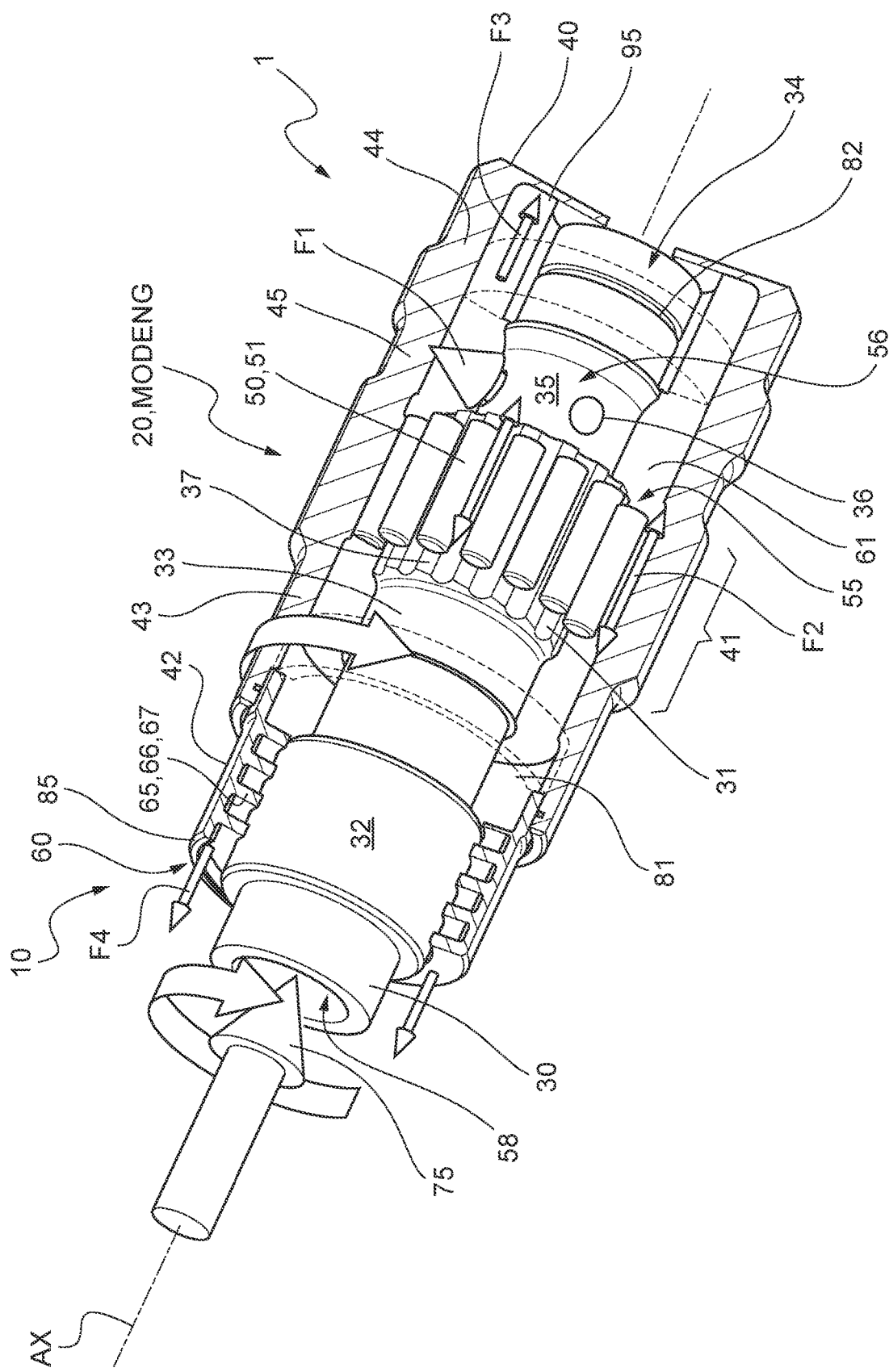
FIG. 1 is a view showing part of a rotational connection system according to the disclosure in three dimensions during an engaged operating mode.

FIG. 1 shows a rotational connection system 10 provided with a free-wheel 20. The free-wheel 20 is provided with a driving part 30 and a driven part 40 that are each able to rotate about the same axis of rotation AX. The driving part may be a one-piece component or may comprise several components secured together. The driven part 40 may be a one-piece component or may comprise several components secured together. At least one section of the driving part 30 or the driven part 40 may be rotationally symmetrical with respect to the axis of rotation AX.

According to a first positioning variant, the driving part 30 may be located radially at least partially between the axis of rotation AX and the driven part 40. According to the illustration shown in FIGS. 1, 2, 3 and 6, the driving part 30 can be surrounded by the driven part 40.

Figure 4:
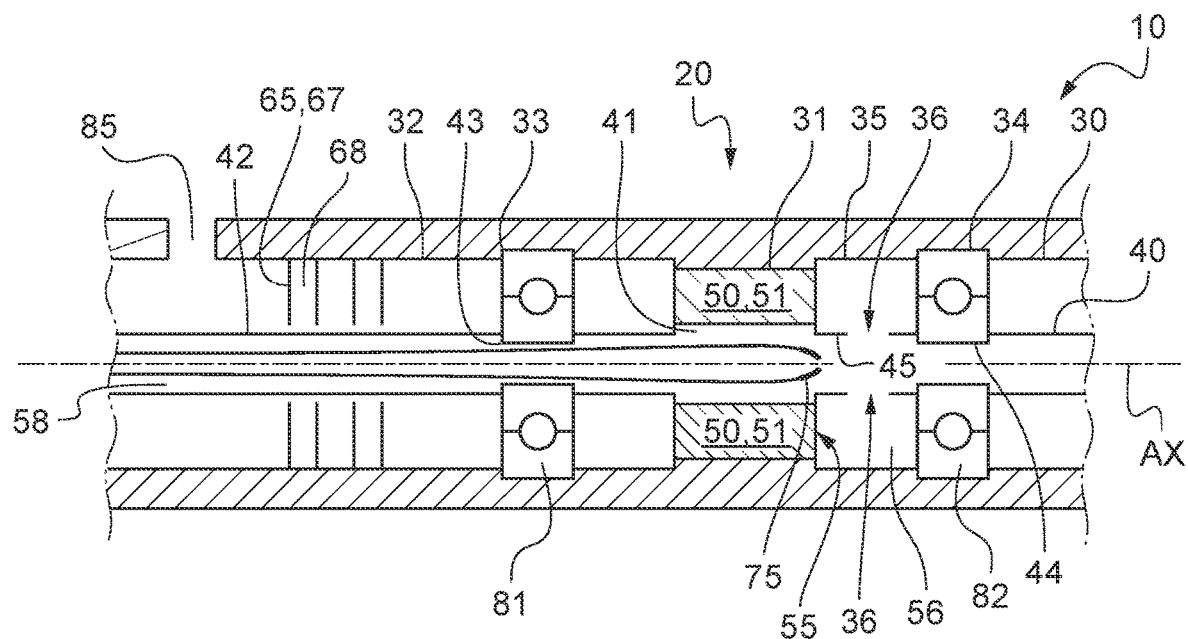
FIG. 4 is a view showing a rotational connection system provided with a worm screw secured to a driven part surrounded by a driving part.
Figure 5:
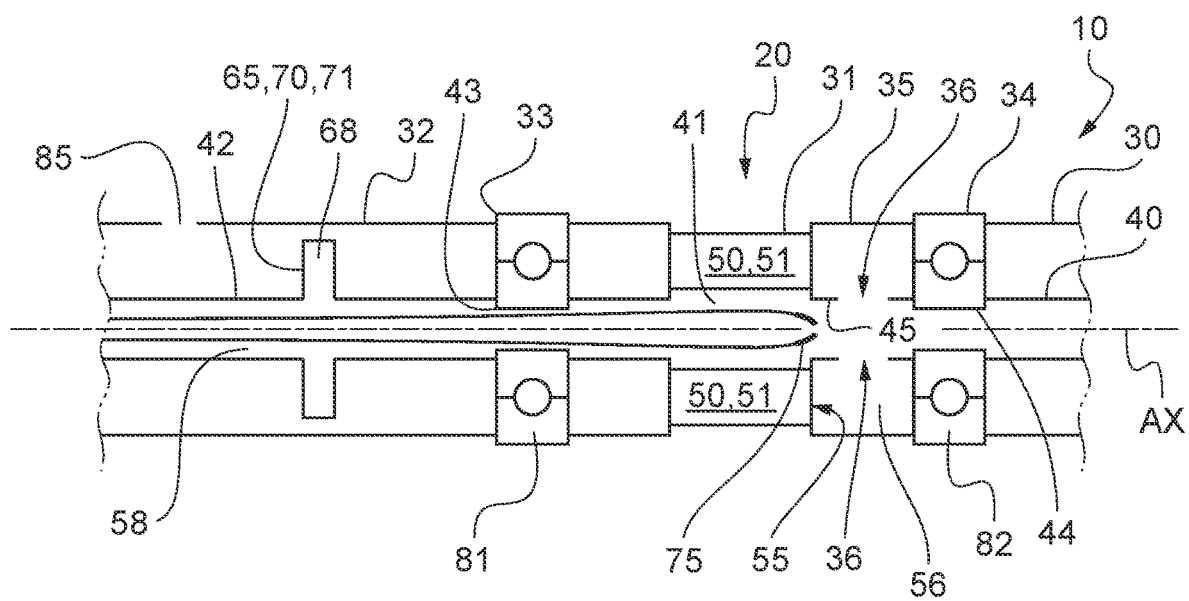
FIG. 5 is a view showing a rotational connection system provided with a pump secured to a driven part surrounded by a driving part.

According to a second positioning variant illustrated with the examples of FIGS. 4 and 5, the driven part 40 may be located radially at least partially between the axis of rotation AX and the driving part 30. The driving part 30 then surrounds the driven part 40.

Irrespective of the variant, one of the driving part and the driven part 40 may then be referred to as the "surrounded part". Thus, the surrounded part is the driving part 30 according to the first positioning variant or the driven part 40 according to the second positioning variant.

Irrespective of the relative position of the driving part 30 and the driven part 40, the rotational connection system 10 may be arranged within any type of architecture.

For example, the rotational connection system 10 may be arranged within a vehicle 1. In particular, the rotational connection system 10 may be arranged within a rotorcraft. According to one example, the driving part 30 may be connected by a kinematic linkage to an engine, while the driven part 40 may be connected by another kinematic linkage to a rotor.

Irrespective of its arrangement, the free-wheel 20 comprises at least one rotational link member 50 for linking the driving part 30 and the driven part 40 in rotation about the axis of rotation AX during an engaged operating mode, and for rotationally disengaging the driving part 30 and the driven part 40 about the axis of rotation AX during a disengaged operating mode.

Irrespective of the number of rotational link members 50, each rotational link member 50 is arranged in a space referred to for convenience as a "linking space 55" on account of the role played by each rotational link member 50. This linking space 55 extends radially, i.e., relative to the axis of rotation AX and therefore perpendicularly to this axis of rotation AX, between the driving part 30 and the driven part 40. In particular, the linking space 55 is arranged between a section of the driving part 30 referred to for convenience as the "driving linking section 31", and a section of the driven part 40 referred to for convenience as the "driven linking section 41".

For example, at least one or, if appropriate, each rotational link member 50 may be in the form of a rolling element 51. Such a rolling element 51 may be a roller- or ball-type rolling element, for example.

Therefore, the driving part 30 may comprise one ramp 37 per rolling element 51. Each ramp 37 may have an inclined or curved face that is, for example, not tangential to a circle centered on the axis of rotation. Conversely, the driven part 40 may comprise a ring facing the ramps 37. Each rolling element 51 may then be free to move between a ramp 37 and said ring during the disengaged operating mode and may be wedged between a ramp 37 and said ring during the engaged operating mode.

Regardless of the above features, the rotational connection system 10 may comprise at least one rotational guide bearing 81, 82, for example between the driving part 30 and the driven part 40. For example, a rotational guide bearing may be in the form of a ball bearing.

According to the example shown, a first guide bearing 81 is interposed radially between a section of the driving part 30, referred to for convenience as the "first driving guide section 33" on account of the fact that it belongs to the driving part 30, and a section of the driven part 40, referred to for convenience as the "first driven guide section 43" on account of the fact that it belongs to the driven part 40.

Similarly, a second guide bearing 82 is interposed radially between a section of the driving part 30, referred to for convenience as the "second driving guide section 34" on account of the fact that it belongs to the driving part 30, and a section of the driven part 40, referred to for convenience as the "second driven guide section 44" on account of the fact that it belongs to the driven part 40.

Irrespective of the preceding features, the rotational connection system 10 is provided with a lubrication device 60. This lubrication device 60 comprises a lubricating fluid 61 that is able to move within the system in order to lubricate, in particular, the contact zones of the free-wheel. For example, this lubricating fluid 61 comprises oil.

In order to force the circulation of the lubricating fluid 61 only during the disengaged operating mode, the lubrication device 60 comprises a fluid circulation device 65.

This fluid circulation device 65 is constrained to rotate with the driven part 40 about the axis of rotation AX. For example, the fluid circulation device 65 is secured to a section of the driven part 40 referred to for convenience as the "driven pumping section 42", a section of the driving part 30 referred to as the "driving pumping section 32" being radially opposite the driven pumping section 42, with respect to the axis of rotation AX.

According to the example shown, the driven pumping section 42 is constrained to rotate, about the axis of rotation AX, with the first driven guide section 43, this first driven guide section 43 itself being constrained to rotate, about the axis of rotation AX, with the driven linking section 41. These various sections may form sections of the same one-piece component or at least two sections may be connected together in a conventional manner.

Similarly, the driving pumping section 32 is constrained to rotate, about the axis of rotation AX, with the first driving guide section 33, this first driving guide section itself being constrained to rotate, about the axis of rotation AX, with the driving linking section 31. These various sections may form sections of the same one-piece component or at least two sections may be connected together in a conventional manner.

Alternatively, the driven pumping section 42 is directly constrained to rotate, about the axis of rotation AX, with the driven linking section 41, and the driving pumping section 32 is directly constrained to rotate, about the axis of rotation AX, with the driving linking section 31.

Irrespective of the above features, the fluid circulation device 65 is set in rotation relative to the driving pumping section 32 only when there is a difference between the driving speed of rotation of the driving pumping section 32 about the axis of rotation AX and the driven speed of rotation of the driven pumping section 42 about the axis of rotation AX and, in particular, when the driving speed of rotation is lower than the driven speed of rotation.

According to the examples shown in FIGS. 1, 2, 4 and 6, the fluid circulation device 65 comprises a worm screw 66. The worm screw 66 may be fastened to the driven pumping section or may form a one-piece component with this driven pumping section 42.

The worm screw 66 may include at least one helical spline 67, 68 that extends radially from the driven pumping section 42 towards the driving pumping section 32. This spline 67, 68 describes a helix about the axis of rotation AX. FIG. 4 shows two splines 67, 68 schematically.

Figure 3:
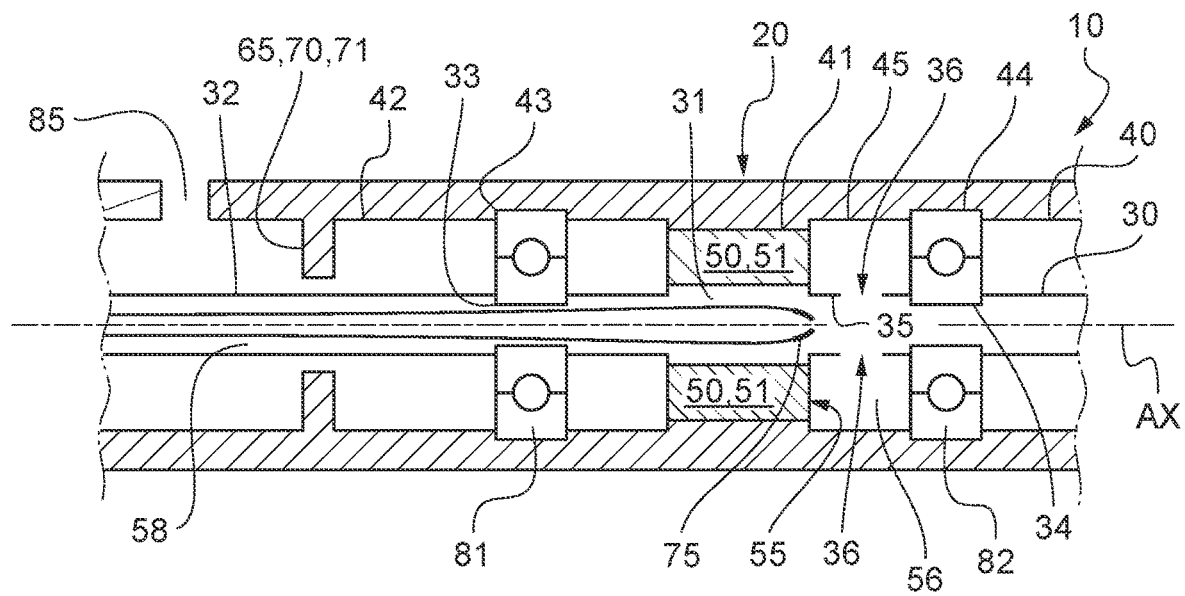
FIG. 3 is a view showing a rotational connection system provided with a pump secured to a driven part surrounding a driving part.

According to the examples shown in FIGS. 3 and 5, the fluid circulation device 65 comprises a pump 70. This pump 70 may be provided with an impeller 71 that is able to rotate together with the driven pumping section 42. For example, this impeller 71 comprises vanes secured to the driven pumping section 42. The vanes extend radially from the driven pumping section 42 towards the driving pumping section 32. The impeller 71 may be fastened to the driven pumping section 42 or may form a one-piece component with this driven pumping section 42.

Irrespective of the nature of the fluid circulation device 65, the driven pumping section 42 may be conical in shape.

Figure 2:
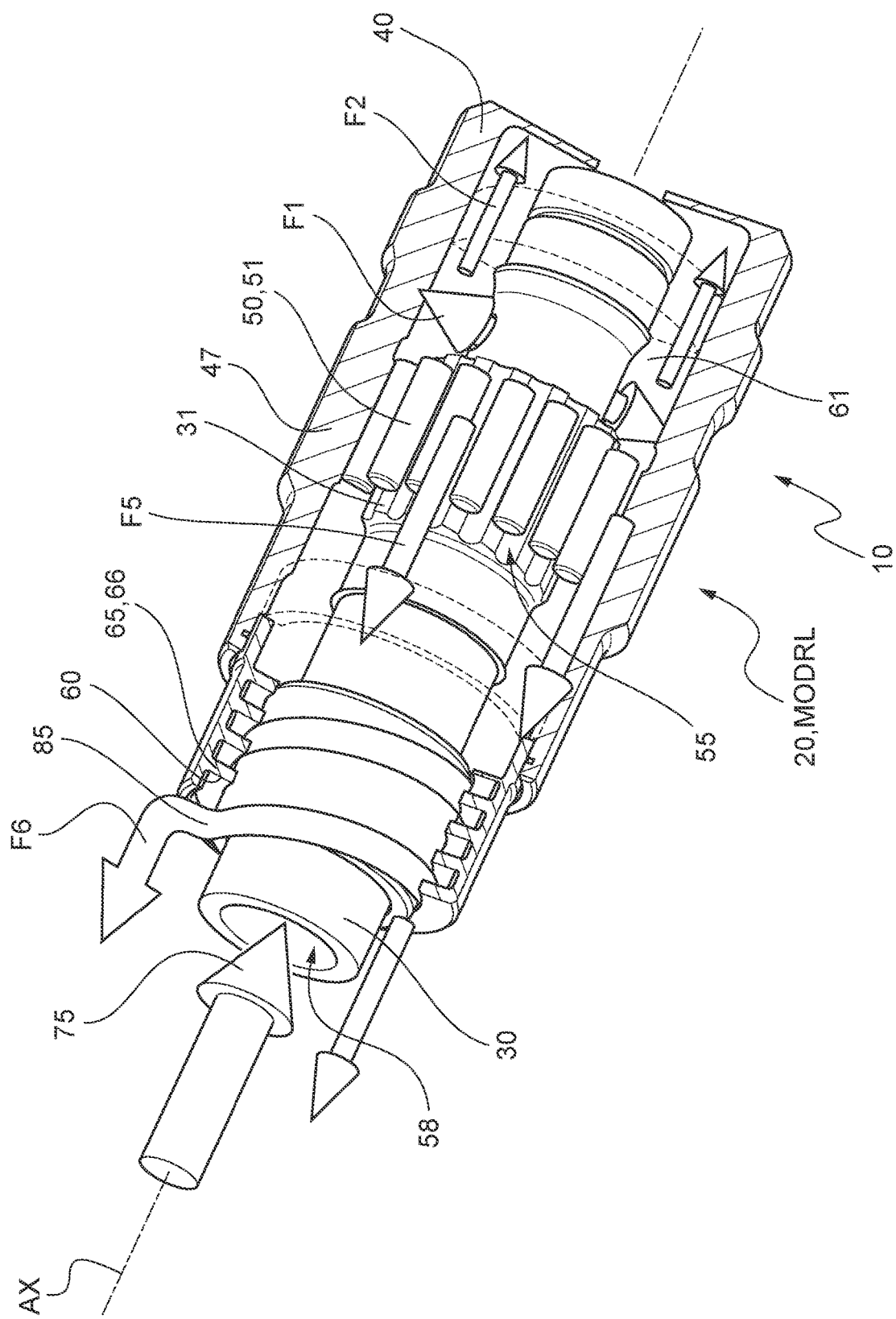
FIG. 2 is a view showing part of the rotational connection system of FIG. 1 in three dimensions during a disengaged operating mode.
Figure 6:
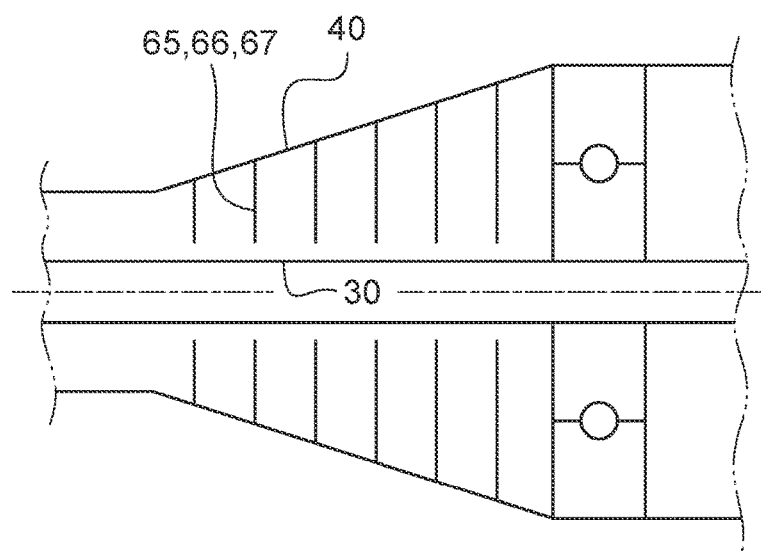
FIG. 6 is a view showing a rotational connection system provided with a worm screw secured to a conical driven part.

FIGS. 1 to 6 show various exemplary embodiments. Thus, FIGS. 1 and 2 show a driven part that surrounds a driving part and that is secured to a worm screw. FIG. 3 shows a driven part that surrounds a driving part and that is secured to an impeller of a pump. FIG. 4 shows a driven part that is surrounded by a driving part and that is secured to a worm screw. FIG. 5 shows a driven part that is surrounded by a driving part and that is secured to an impeller of a pump. FIG. 6 shows a conical driven part that surrounds a driving part and that is secured to a worm screw.

Irrespective of the preceding features, in order to convey the lubricating fluid, the lubrication device 60 may have at least one radial port 36 opening into a space referred to for convenience as the "injection space 56". This injection space 56 is situated radially, with respect to the axis of rotation AX, between a driving injection section 35 of the driving part 30 and a driven injection section 45 of the driven part 40.

According to the example shown in FIG. 1, the driven linking section 41 is directly constrained to rotate, about the axis of rotation AX, with the driven injection section 45, and the driving linking section 31 is directly constrained to rotate, about the axis of rotation AX, with the driving injection section 35. Alternatively, a guide section or the like may be interposed between a pumping section and a corresponding injection section.

Optionally and irrespective of this latter aspect, the driving linking section 31 is then located, along the axis of rotation AX and therefore along a direction parallel to the axis of rotation AX, between the driving pumping section 32 and the driving injection section 35. Similarly, the driven linking section 41 is situated, along the axis of rotation AX and therefore along a direction parallel to the axis of rotation AX, between the driven pumping section 42 and the driven injection section 45.

According to the examples shown, the radial port or ports 36 are provided in the surrounded part. However, the reverse is also possible.

According to another aspect, the lubrication device 60 may include an injector 75 connected to a lubrication circuit. The injector 75 injects the lubricating fluid 61, if applicable, into the internal space 58, in the vicinity of the radial port or ports. The lubricating fluid then penetrates into the system, and possibly into the injection space 56, at a flow rate referred to as the "feed flow rate".

Irrespective of the preceding features, at least one of the driving part 30 and the driven part 40 has one or more passages 85 for discharging the lubricating fluid 61. Consequently, the fluid circulation device 65 is positioned between the linking space 55 and this or these passages 85.

For example, the lubricating fluid 61 is introduced into an internal space inside the surrounded part, and the driving or driven pumping section that surrounds the passage section of the surrounded part includes such a passage 85 that opens towards an environment outside the system. The reverse is also possible.

The system 10 may include an opening 95 opposite a passage 85 for discharging the lubricating fluid 61 in another direction.

FIGS. 1 and 2 show the operation of the disclosure.

Irrespective of the embodiment, during an injection step, the lubricating fluid 61 may be introduced into the rotational connection system 10 by an injector 75, for example into the internal space according to FIG. 1.

This lubricating fluid 61 enters the injection space 56 via the radial port or ports 36 in the direction shown by the arrow F1 and according to the feed flow rate.

During the engaged operating mode MODENG shown in FIG. 1, a first portion of the lubricating fluid 61 may, if necessary, be discharged through the opening 95 in the direction of the arrow F3. A second portion of the lubricating fluid 61 immerses the link members in the direction of the arrows F2 while moving at a low leakage flow rate. The leakage flow rate may be less than the feed flow rate in order to immerse the contact zones. Specifically, the link members in particular can induce such a low leakage flow rate. A fraction of the lubricating fluid 61 may be discharged via the passage or passages 85.

During the disengaged operating mode MODENG shown in FIG. 2, the driving part 30 and the driven part 40 are rotationally disengaged from each other about the axis of rotation AX. Consequently, the method of the disclosure comprises a step of setting the fluid circulation device 65 in rotation with respect to the driving part 30. The fluid circulation device 65 tends to draw in the lubricating fluid 61. This results in the forced movement of the lubricating fluid 61 within the linking space 55, in the direction shown by the arrows F5. Unlike in the engaged operating mode MODENG, the lubricating fluid 61 does not tend to come to a standstill or move very slowly within the linking space, but is sucked in and then, if necessary, discharged through the passage or passages 85 in the direction shown by the arrow F6. The leakage flow rate of the lubricating fluid in the linking space 55 is then high owing to the fluid circulation device 65. This leakage flow rate may tend to be greater than the feed flow rate in order to drain the lubricating fluid out of the linking space.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A rotational connection system provided with a freewheel, the free-wheel including a driving part and a driven part that are able to rotate about an axis of rotation, the free-wheel including at least one rotational link member arranged in a linking space, the linking space being located radially, relative to the axis of rotation, between a driving linking section of the driving part and a driven linking section of the driven part, the rotational connection system including a lubrication device for lubricating the free-wheel, the lubrication device including a lubricating fluid, wherein the lubrication device comprises a fluid circulation device constrained to rotate, about the axis of rotation, with a driven pumping section of the driven part, a driving pumping section of the driving part and the driven pumping section being arranged one around the other radially with respect to the axis of rotation, the fluid circulation device being set in rotation with respect to the driving pumping section when a driving speed of rotation of the driving pumping section about the axis of rotation is lower than a driven speed of rotation of the driven pumping section about the axis of rotation in order to generate a forced circulation of the lubricating fluid within the linking space.

2. The system according to claim 1 wherein the fluid circulation device includes a pump.

3. The system according to claim 2 wherein the pump is provided with a rotary impeller that is constrained to rotate with the driven pumping section.

4. The system according to claim 1 wherein the fluid circulation device includes a worm screw.

5. The system according to claim 4 wherein the worm screw includes at least one helical spline constrained to rotate with the driven pumping section.

6. The system according to claim 1 wherein the driven pumping section is conical in shape.

7. The system according to claim 1 wherein the at least one rotational link member comprises a plurality of rolling elements, each rolling element being able to move on a ramp of the driving part.

8. The system according to claim 1 wherein the lubrication device includes at least one radial port opening into an injection space, the injection space being located radially with respect to the axis of rotation between a driving injection section of the driving part and a driven injection section of the driven part.

9. The system according to claim 8 wherein the driving linking section is located between the driving pumping section and the driving injection section, and the driven linking section is located between the driven pumping section and the driven injection section.

10. The system according to claim 8 wherein a surrounded part of the driven part is surrounded at least partially by the driving part or a surrounded part of the driving part is surrounded at least partially by the driven part, the at least one radial port is provided in the surrounded part, the surrounded part surrounding an internal space, the at least one radial port being in fluid communication with the internal space and the injection space.

11. The system according to claim 10 wherein the lubrication device includes an injector which injects the lubricating fluid into the internal space.

12. The system according to claim 1 wherein the rotational connection system includes at least one rotational guide bearing arranged between the driving part and the driven part.

13. The system according to claim 1 wherein at least the driving part or the driven part comprises at least one passage for discharging the lubricating fluid, the fluid circulation device being arranged along the axis of rotation between the linking space and the at least one passage.

14. A vehicle wherein the vehicle comprises the rotational connection system according to claim 1.

15. A method for lubricating the rotational connection system that is provided with a free-wheel, the free-wheel including a driving part and a driven part that are able to rotate about an axis of rotation, the free-wheel including at least one rotational link member arranged in a linking space, the linking space being located radially, relative to the axis of rotation, between a driving linking section of the driving part and a driven linking section of the driven part, the rotational connection system including a lubrication device for lubricating the free-wheel, the lubrication device including a lubricating fluid, wherein the method includes the following steps:

during a disengaged operating mode of the free-wheel during which the driving part and the driven part are rotationally disengaged from each other about the axis of rotation, a fluid circulation device of the lubrication device is set in rotation, relative to a driving pumping section of the driving part, by speed differential between a driving speed of rotation, about the axis of rotation, of the driving pumping section and a driven speed of rotation, about the axis of rotation, of a driven pumping section constrained to rotate with the fluid circulation device, and the lubricating fluid is forced to move within the linking space at least under the influence of the fluid circulation device.

* * * * *